United States Patent [19]

Babayan

[11] 4,331,582

[45] May 25, 1982

[54] EPOXY LATENT CATALYST

[75] Inventor: Eduard P. Babayan, Huntington Beach, Calif.

[73] Assignee: Hitco, Irvine, Calif.

[21] Appl. No.: 111,936

[22] Filed: Jan. 14, 1980

[51] Int. Cl.³ ............................................. C08G 59/68
[52] U.S. Cl. .............................. 523/453; 252/188.3 R; 525/507; 528/90; 528/94; 528/109; 528/117; 528/391; 428/322.2; 523/466; 523/468
[58] Field of Search .................... 525/507; 528/90, 94, 528/109, 117, 391; 260/37 EP; 548/335; 252/188.3 R

[56] References Cited

U.S. PATENT DOCUMENTS

| | | | |
|---|---|---|---|
| 2,897,179 | 7/1959 | Schechter et al. | 528/407 |
| 3,438,937 | 4/1969 | Christie | 528/117 |
| 3,553,166 | 1/1971 | Anderson et al. | 528/117 |
| 3,562,213 | 2/1971 | Collis | 528/94 X |
| 3,635,894 | 1/1972 | Dowbenko et al. | 528/90 X |
| 3,678,007 | 7/1972 | Dowbenko et al. | 528/109 X |
| 3,746,686 | 7/1973 | Marshall et al. | 528/117 |
| 3,755,253 | 8/1973 | Rice | 528/109 |

OTHER PUBLICATIONS

Staab et al., "Thionyldiimidazole and Sulfuryldiimidazole" Chemical Abstracts 65, 12195f (1966).

*Primary Examiner*—Earl A. Nielsen
*Attorney, Agent, or Firm*—Marvin E. Jacobs

[57] ABSTRACT

A catalyst for forming ambient temperature stable diamino-diphenyl sulfone-epoxy composition comprises the half-salt of a strong aromatic sulfonic acid such as toluene sulfonic acid and an imidazole, preferably an alkylated imidazole such as 2-ethyl-4-methylimidazole. The composition fully cures at moderate temperature to form a humidity resistant resin having a high heat distortion temperature and can be impregnated onto reinforcing fibers such as graphite to form composites.

14 Claims, No Drawings

EPOXY LATENT CATALYST

DESCRIPTION

TECHNICAL FIELD

The present invention relates to ambient temperature stable epoxy resins and more particularly for a latent catalyst for promoting the reaction of diaminodiphenyl sulfone with epoxies at elevated temperature to form insoluble and infusible products.

BACKGROUND ART

There is need for improved resins for advanced, high performance composites for aircraft, space and consumer applications. Diaminodiphenyl sulfone (DDS) has been added to high temperature epoxy formulations to provide humidity resistance. However, the DDS-epoxy reaction is extremely slow and the material never cures completely. The most widely utilized latent catalysts for promoting the reaction of DDS with epoxies are $BF_3$-amine complexes. However, the $BF_3$-complex is a much better accelerator of the epoxy to epoxy reaction and when used in conjunction with DDS, because of the sluggishness of the DDS-epoxy reaction, a substantial portion of the DDS remains unreacted, acting as a plasticizer in the cured product.

Imidazoles and especially alkylated imidazoles are known to provide high temperature epoxies with excellent properties. However, these formulations gel in minutes and do not provide any latency.

DISCLOSURE OF THE INVENTION

A catalyst has been discovered in accordance with this invention that provides long shelf-life, yet provides accelerated cure of the DDS-epoxy reaction at moderate temperature to provide fully cured, high cross-link density, himidity resistant materials having a high heat distortion temperature. Curable compositions containing the catalyst of this invention are stable up to temperatures of 200 degrees F.

The latent catalyst of this invention is a half salt of an imidazole and a strong organic acid soluble in the epoxy resin such as a benzene or alkylated benzene sulfonic acid containing 1 to 3 $C_1$ to $C_8$ alkyl groups, suitably toluene sulfonic acid (TSA) or benzene sulfonic acid. Imidazole exhibits no latency and the double salt of the imidazole is very inactive.

Imidazoles that can be utilized can be substituted with one or more alkyl of 1 to 6 carbon atoms or aryl which can be positioned on the amino nitrogen or heterocyclic carbon atoms. Representative imidazoles can be selected from compounds of the formula:

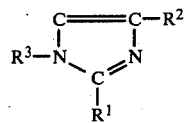

where $R^1$, $R^2$ and $R^3$ are selected from hydrogen, alkyl, aralkyl, hydroxyalkyl, cyanoalkyl and phenyl. Exemplary compounds are imidazole, 2-methylimidazole, 2-ethyl-4-methylimidazole, 2-phenylimidazole, 1-benzyl-2-methylimidazole, 2-phenyl-4,5-dihydroxymethylimidazole, 2-phenyl-4-methylimidazole, 1-cyanoethyl-2-methylimidazole, 1-cyanoethyl-2-phenylimidazole. 3,4-dialkyl imidazoles are preferred since they provide accelerated and advanced cure of the DDS-epoxy reaction at moderate temperature and provide cured materials with the highest heat distortion temperatures.

The novel catalyst of the invention is prepared by mixing 1 mol of the imidazole with 1 mol of the acid in solvent followed by evaporation of the solvent. Suitable solvents are ketones such as acetone, methyl ethyl ketone or methyl isobutyl ketone. The catalyst is present in the epoxy formulation in an amount from 0.25% to 10.0% by weight, suitably from 0.5 to 6% by weight.

The diamino-diphenyl sulfone is present in the formulation in an amount from 10% to 35% by weight, preferably from 15% to 25% by weight. The amino groups can be in the 3 or 4 positions. The aryl groups may be substituted with groups that do not interfere with the curing reaction such as alkyl or substituted alkyl.

The remainder of the formulation comprises an epoxy resin or polyepoxide which may be of the aromatic or aliphatic type. Epoxy resins include organic compounds containing a plurality of epoxy groups.

The polyepoxide-containing compositions which can be cured using the novel curing agent comprise organic materials having a plurality of reactive 1,2-epoxy groups. These polyepoxide materials can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like.

A widely used class of polyepoxides which can be catalyzed according to the practice of the present invention encompasses the resinous epoxy polyethers obtained by reacting an epihalohydrin, such as epichlorohydrin, epibromohydrin, epiiodihydrin, and the like, with either a polyhydric phenol or a polyhydric alcohol. In addition, the phenolic rings may have other substituents besides the hydroxyl group, for example, lower alkyl groups containing from one to four carbon atoms, e.g., methyl, ethyl, propyl, isopropyl, butyl, sec-butyl and tert-butyl groups, halogen atoms, i.e., fluorine, chlorine, bromine or iodine, and the like.

An illustrative, but by no means exhaustive listing of dihydric phenols falling within this general formula includes 4,4'-dihydroxydiphenylmethylmethane, (Bisphenol A), 2,4'-dihydroxydiphenylethylmethane 3,3'-dihydroxydiphenyldiethylmethane 3,4'-dihydroxyphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane, and the like.

Other polydydric phenols which may also be co-reacted with an epihalohydrin to provide these resinous epoxy polyethers are such compounds as resorcinol, hydroquinone, substituted hydroquinones, e.g., p-tert.-butylhydroquinone, and the like, indanols such as those disclosed in U.S. Pat. No. 2,754,285 to Petropoulos, and polyhydric phenols having two hydroxyl aryl groups separated by an aliphatic chain of at least six carbon atoms in length, said chain being attached by carbon-to-carbon bonding to nuclear carbon atoms of the hydroxylaryl groups. All of such glycidyl ethers have a 1,2 epoxy equivalency greater than 1, usually between 1 and 2 epoxy equivalency greater than 1, usually between 1 and 2 and can be prepared by the method described in U.S. Pat. No. 2,538,072.

Among the polyhydric alcohols which can be co-reacted with an epihalohydrin to provide these resinous epoxy polyethers are such compounds as ethylene glycols, pentane diols, bis-(4-hydroxycyclohexyl)-dimethylmethane, 1,4-dimethylolbenzene, glycerol, 1,2,6-hexanetriol, trimethylol propane, manitol, sorbitol, erythritol, pentaerythritol, their dimers, trimers and higher polymers, e.g., polyethylene glycols, polypropylene glycols, triglycerol, dipentaerythrito and the like, polyallyl alcohol, polyvinyl alcohol, polyhydric thioethers such as 2,2'-dihydroxydiethyl sulfide, 2,2',3,3'-tetrahydroxydipropyl sulfide and the like, mercapto alcohols such as -monothio-glycerol, , -dithioglycerol, and the like, polyhydric alcohol partial esters such as monostearin, pentaerythritol monoacetate and the like polyhydric alcohol partial esters such as monostearin, pentaerythritol monoacetate and the like, and halogenated polyhydric alcohols such as the monochlorohydrins of glycerol, sorbitol, pentaerythritol and the like.

Preferred curable compositions include the highly active and reactive expoxidized novolac and epoxidized alkylene dianiline materials that cure to form materials stable at temperatures of up to 400 degrees F. or more. Epoxidized novolacs are obtained by reacting, preferably in the presence of basic catalyst such as sodium hydroxide, an epihalohydrin such as epichlorohydrin with the resinous condensate of an aldehyde, e.g., formaldehyde, and either a monohydric phenol, e.g. phenol or creosol or a polyhydric phenol, e.g. bisphenol A. Representative novolacs based on monohydric phenols are selected from compounds of the formula:

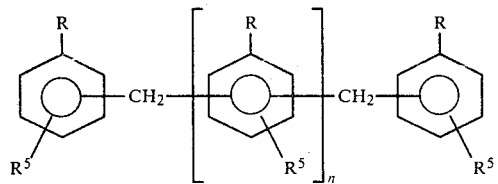

where R is

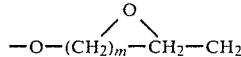

and $R^5$ is H or methyl, m is an integer from 1 to 4 and n is an integer. The epoxy novolac resin may be liquid or semi-solid.

Epoxidized alkylene dianiline is selected from compounds of the formula:

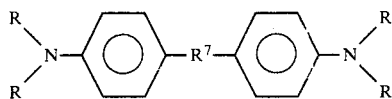

where R is as defined above and $R^7$ is alkylene from 1 to 4 carbon atoms. A representative commercially available material is the tetraglycidyl ether of methylene dianiline (TGMDA).

The composition may optionally contain other curing promoters or accelerators and various other materials such as plasticizers, elastomers, fillers, pigments, mold release agents or other resins. The composition may be dissolved in solvent such as acetone in an amount from 15 to 40% solids, but is preferably prepared neat as a prepreg to impregnate reinforcing materials such as fiberglass, carbon or graphite fibers to form composites containing from 30% to 70% fiber, preferably from 40 to 60% fiber.

The composition is cured by heating it to a temperature above 275 degrees F., though this may require a post-cure at a higher temperature. Curing at temperatures of 425 degrees F. would probably be uncontrollable due to excessive exotherm. Adequate cure is provided by heating the composition to a temperature of 325 degrees F. to 375 degrees F. for 1 to 3 hours. The composition of the invention will find use as a prepreg resin for high performance composites to be used as structural components for advanced aircraft and spacecraft.

These and many other features and attendant advantages of the invention will become apparent as the invention becomes better understood by reference to the following detailed description and exemplary embodiments of the invention.

DETAILED DESCRIPTION OF THE INVENTION

EXAMPLE 1

The following blend was made and its gel time at 350 degrees F. taken. Part of the blend was kept at room temperature for one week and its gel time was rechecked. The gel time on recheck was the same as before, indicating that essentially no advancement occurred.

Tetraglycidyl ether of 4,4 diamino diphenyl methane (TGDDM) 77 g.
4,4 diamino diphenyl sulfone (DDS) 23 g.
Gel time on a 350 degree F. hot plate—19 minutes.
Gel time on a 350 degree F. hot plate after one week storage at room temperature, unchanged.

The cured material was subjected to differential scanning calorimetry (DSC) and showed a residual exotherm at 255 degrees C. which disappears on rerunning the same specimen. This indicates that the material was not fully cured and that residual exothermic reaction took place during this test.

EXAMPLE 2

The following blend was made and its gel time at 350 degrees F. taken.
TGDDM 95 g.
$BF_3$ monoethyl amine complex 5 g.
Gel time on a 350 degree F. hot plate—less than 10 seconds.

It is customary to use a $BF_3$-amine as an accelerator of the DDS-epoxy reaction. As can be seen from the above example, the $BF_3$-amine is a very good catalyst for the epoxy-to-epoxy reaction (less than 10 seconds to gel). Therefore, when this catalyst is used in conjunction with DDS, it can be expected that because of the sluggishness of the DDS-epoxy reaction (Example 1-19 minutes) a large part of the DDS stays unreacted, acting as a plasticizer in the cured product.

EXAMPLE 3

The following blend was made and its gel time at 350 degrees F. taken. Part of the blend was kept at room temperature. After one day, this blend had gelled.
TGDDM 98 g.
24 EMI 2 g.

Gel time on a 350 degree F. hot plate—46 seconds.

As mentioned above, the blend on storage at room temperature gelled overnight indicating no latency.

EXAMPLE 4

The following blend was made and its gel time at 350 degrees F. taken. Part of the blend was kept at room temperature and its gel time rechecked after one week.

TGDDM 95 g.

Half-salt of 24 EMI and TSA 5 g.

Gel time on a 350 degree F. hot plate—60 minutes.

Gel time on a 350 degree F. hot plate after one week storage at room temperature—60 minutes.

The gel is very soft indicating only partial cure. The half-salt is not a good catalyst by itself for the epoxy-epoxy reaction.

EXAMPLE 5

The following blend was made and its gel time at 350 degrees F. taken. Part of the blend was kept at room temperature and its gel time rechecked after one week.

Tetraglycidyl ether of 4,4 diamino diphenyl methane (TGDDM) 74 g.

4,4 Diamino diphenyl sulfone (DDS) 22.3 g.

Half-salt of 24 EMI and TSA 3.7 g.

Gel time on a 350 degree F. hot plate—8 minutes.

Gel time on a 350 degree hot plate after one week storage at room temperature, unchanged.

This indicates that the half salt is a latent catalyst. The cured product of Example 5 was subjected to DSC and did not show an exotherm indicating that the material was fully cured. Thus, though the half-salt of 2,4 EMI is not a good catalyst for the epoxy-to-epoxy reaction, it is an excellent accelerator for the DDS-to-epoxy reaction.

It is to be realized that only preferred embodiments of the invention have been described and that numerous substitutions, modifications and alterations are permissible without departing from the spirit and scope of the invention as defined in the following claims.

I claim:

1. A curable composition having an extended pot life at temperatures below 200 degrees F. comprising:

0.25% to 10% by weight of a half-salt of an imidazole and a strong aromatic acid soluble in epoxy selected from benzene sulfonic acid or alkylated benzene sulfonic acid containing 1 to 3 $C_1$ to $C_8$ alkyl groups, said imidazole being selected from compounds of the formula;

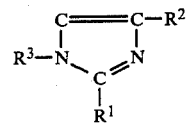

where $R^1$, $R^2$ and $R^3$ are selected from hydrogen, alkyl, aralkyl, hydroxyalkyl, cyanoalkyl and phenyl;

10% to 35% by weight of a diamino-diphenyl sulfone; and remainder being an organic material containing a plurality of epoxy groups.

2. A curable composition having an extended pot life at temperatures below 200 degrees F. comprising:

0.25% to 10% by weight of a half-salt of an imidazole and a strong aromatic sulfonic acid soluble in epoxy, said imidazole being selected from compounds of the formula;

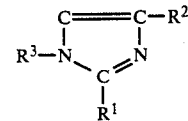

where $R^1$, $R^2$ and $R^3$ are selected from hydrogen, alkyl, aralkyl, hydroxyalkyl, cyanoalkyl and phenyl;

10% to 35% by weight of a diamino-diphenyl sulfone; and remainder being an organic material containing a plurality of epoxy groups selected from epoxidized novolac and epoxidized alkylene dianiline materials.

3. A composition according to claim 2 in which the material is an epoxidized methylene dianiline.

4. A composition according to claim 3 in which the material is tetraglycidyl ether of methylene dianiline.

5. A composition according to claim 4 in which the acid is toluene sulfonic acid.

6. A composition according to claim 4 in which the imidazole is a 2,4-dialkyl imidazole in which the alkyl groups contain from 1 to 6 carbon atoms.

7. A composition according to claim 6 in which the imidazole is 2-ethyl-4 methylimidazole.

8. A composite material comprising in combination; 30% to 70% by weight of reinforcing fiber and remainder being the composition of claim 1.

9. A composite according to claim 8 in the form of sheets of prepreg material.

10. A composite according to claim 9 in which the fiber is selected from fiberglass, carbon and graphite fibers.

11. A composition of matter comprising an organic material containing a plurality of epoxy groups having dissolved therein, and the half-salt of a strong aromatic sulfonic acid selected from benzene sulfonic acid or alkylated benzene sulfonic acid containing 1 to 3 $C_1$ to $C_8$ alkyl groups, said sulfonic acid being soluble in epoxy and an imidazole of the formula:

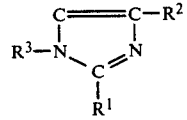

where $R^1$, $R^2$ and $R^3$ are selected from hydrogen, alkyl, aralkyl, hydroxyalkyl, cyanoalkyl and phenyl.

12. A composition according to claim 11 in which the acid is toluene sulfonic acid.

13. A composition according to claim 12 in which the imidazole is a 2,4-dialkyl imidazole in which the alkyl groups contain from 1 to 6 carbon atoms.

14. A composition according to claim 13 in which the imidazole is 2-ethyl-4 methylimidazole.

* * * * *